J. JAMISON.
Steam-Traps.

No. 213,572. Patented Mar. 25, 1879.

Witnesses:
F. W. Howard
Willard Walling

Inventor:
John Jamison
per Edw. W. Donn
Atty.

UNITED STATES PATENT OFFICE.

JOHN JAMISON, OF TURNER'S FALLS, MASSACHUSETTS.

IMPROVEMENT IN STEAM-TRAPS.

Specification forming part of Letters Patent No. 213,572, dated March 25, 1879; application filed October 17, 1878.

*To all whom it may concern:*

Be it known that I, JOHN JAMISON, of Turner's Falls, in the county of Franklin and Commonwealth of Massachusetts, have invented a new and useful Improvement in Automatic Steam-Traps for Heaters, Driers, &c., of which the following is a full specification:

My invention relates to that class of automatic steam-traps provided for the escape of superfluous steam and of the water of condensation from coils and radiators, &c.

Many contrivances intended to effect this have been invented, but to all there is some objection of complication or great expense, or of imperfect working. A great objection to the simpler ones is the unequal working, by which steam or water escapes—hissing or dribbling without thorough and accurate control. Others constructed with floats are expensive and liable to get out of repair.

The accompanying drawings represent my invention, in which—

Figure 1:
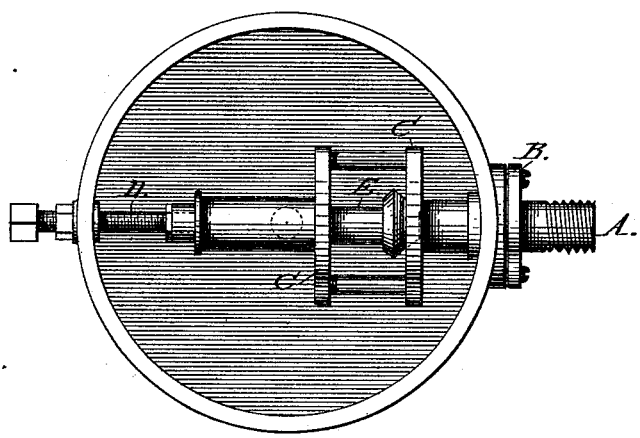
Figure 2:
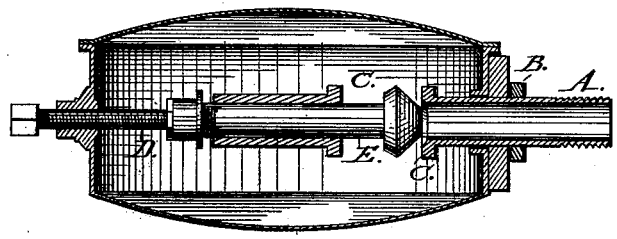

Figure 1 shows an elevation of the trap with the cover removed, and Fig. 2 a section through the trap and pipe running into it.

It consists of a metallic case, which may be round, rectangular, or of any other desired form. On the one side enters the tube or pipe A, of any suitable length, carrying the superfluous steam or water from the drier or heater.

This tube or pipe A passes through and is packed in a sleeve which enters the case far enough to give the tube a tight and firm support, and is secured to the case by a collar and clamp, B, on the outside steam-tight. The lower end of this tube A is secured by a steam-tight joint to the upper arm of a yoke, C, on the under side of which is turned a valve-seat.

The lower arm of the yoke has a sleeve running down till it is met by a stop controlled by a screw and set-nut, D, passing through the opposite side of the case. Through this sleeve passes a valve-stem, having on its upper end an accurately-fitted conical valve or plug, E, which fits into the valve-seat in the upper arm of the yoke, while its lower end, coincident with the sleeve, meets the stop on the screw D, which controls its movement perpendicularly.

It will be perceived that the yoke C, with its upper arm forming the valve-seat, and with the sleeve on its lower arm controlling the action of the valve-stem, secures an exact and unvarying perpendicular action, insuring certainty and security.

Through the side of the case opposite the entrance of the steam-pipe, which is re-enforced by a collar thick enough to insure firmness and direction of action, passes the screw D, having a burr or head for turning and also a set-nut for retaining it in position when fixed. On the upper end of this screw is the stop already mentioned for meeting the sleeve and stem of the valve.

The operation of the trap is as follows: By the action of the screw and nut D the valve is adjusted nearly to its seat, but just enough open to allow the discharge of water from the pipe leading from the radiator, where it has formed by condensation as the pipe grows cold.

The case containing the trap being firmly secured to the floor or wall, when the pipe becomes heated by the steam it expands longitudinally enough to bring the seat tightly down upon the valve. The pipe then, as the steam ceases to pass through, gradually cools, the steam condensing into water. The pipe contracts sufficiently to open the valve for the escape of the water till it again becomes heated by the steam and closes, thus automatically opening and closing as the pipe is heated by the steam or cooled by the condensation of water.

The case may have an opening for the discharge of the water condensed at any convenient point in the side or bottom.

What I desire to claim, and secure by Letters Patent, is—

1. In a steam-trap, the yoke or frame having a valve-seat on one arm and a sleeve for the valve-stem on the other, by which the action of the valve is rendered exact and unvarying, as described.

2. In a steam-trap, the combination of the case admitting the discharge-pipe on one side, with a regulating-screw on the other, with the pipe and yoke, with sleeve and valve-stem, and seat controlling the action of the valve, all as described, and substantially as set forth.

JOHN JAMISON.

Witnesses:
 JAMES S. GRINNELL,
 GEORGE E. BATTEN.